(12) United States Patent
Kikuchi

(10) Patent No.: US 10,229,362 B2
(45) Date of Patent: Mar. 12, 2019

(54) INFORMATION PROCESSING METHOD

(71) Applicant: FUJITSU LIMITED, Kawasaki-shi, Kanagawa (JP)

(72) Inventor: Shinji Kikuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 666 days.

(21) Appl. No.: 14/886,956

(22) Filed: Oct. 19, 2015

(65) Prior Publication Data

US 2016/0155060 A1    Jun. 2, 2016

(30) Foreign Application Priority Data

Nov. 27, 2014    (JP) .................................. 2014-240185

(51) Int. Cl.
 G06N 7/00    (2006.01)
 G06Q 30/04    (2012.01)

(52) U.S. Cl.
 CPC ............. G06N 7/005 (2013.01); G06Q 30/04 (2013.01)

(58) Field of Classification Search
 CPC combination set(s) only.
 See application file for complete search history.

(56) References Cited

U.S. PATENT DOCUMENTS 8,756,093 B2\* 6/2014 Isozaki ............... G06Q 10/0633
 705/7.11
8,904,234 B2\* 12/2014 Matsubara .......... G06F 11/0748
 714/26

(Continued)

FOREIGN PATENT DOCUMENTS

JP    2008-276641 A    11/2008
JP    2011-150504 A    8/2011
(Continued)

OTHER PUBLICATIONS

IEEE Transactions on Software Engineering, vol. 33, No. 6, Jun. 2007 369 pp. 369-384 Adaptive Service Composition in Flexible Processes Danilo Ardagna and Barbara Pernici IEEE Published by the IEEE Computer Society.\*

(Continued)

Primary Examiner — Michael B Holmes
(74) Attorney, Agent, or Firm — Fujitsu Patent Center

(57) ABSTRACT

An information processing method includes, when receiving a workflow including a conditional branch and procedures, obtaining branch probability information corresponding to a classification of the conditional branch, the branch probability information being calculated for each piece of classification information defined for the conditional branch and indicating a probability that a condition has been satisfied in an executed conditional branch; obtaining cost information and availability information that correspond to the procedure, the cost information indicating a cost needed for a service provided by the procedure, and the availability information indicating availability of the service; calculating an execution probability of the procedure on the basis of the obtained branch probability information; and calculating a probability that the received workflow properly or improperly terminates, and a cost needed to execute the received workflow by using the calculated execution probability of the procedure, the obtained cost information and the obtained availability information.

4 Claims, 21 Drawing Sheets

(56) References Cited

U.S. PATENT DOCUMENTS

| | | | | |
|---|---|---|---|---|
| 8,918,792 | B2* | 12/2014 | Kanna | G06F 9/5016 |
| | | | | 718/104 |
| 8,966,492 | B2* | 2/2015 | Kikuchi | H04L 41/147 |
| | | | | 370/328 |
| 9,201,993 | B2* | 12/2015 | Seningen | G06F 17/5036 |
| 9,477,742 | B2* | 10/2016 | Kikuchi | G06F 11/3006 |
| 10,089,441 | B2* | 10/2018 | Day | G06F 19/00 |
| 2008/0183519 | A1* | 7/2008 | King | G06Q 10/10 |
| | | | | 705/30 |
| 2011/0270963 | A1 | 11/2011 | Saito et al. | |
| 2013/0297283 | A1 | 11/2013 | Maeno | |

FOREIGN PATENT DOCUMENTS

| | | |
|---|---|---|
| WO | 2011-018827 | 2/2011 |
| WO | 2013-031129 | 3/2013 |

OTHER PUBLICATIONS

ACM Transactions on the Web, vol. 1, No. 1, Article 6, Publication date: May 2007.Efficient Algorithms for Web Services Selection with End-to-End QoS Constraints Ao Yu, Yue Zhang, and Kwei-Jay Lin University of California, Irvine pp. 1-26.*

ScienceDirect Elsevier Information and Software Technology vol. 44, Issue 7, May 15, 2002, pp. 405-417 Critical path identification in the context of a workflow Duk-Ho Chang, Jin Hyun Son, Myoung Ho Kim.*

ACM (DL) Digital Library on building workflow models for flexible processes Peter Mangan Shazia Sadiq Proceeding ADC '02 Proceedings of the 13th Australasian database conference—vol. 5 pp. 103-109 Melbourne, Victoria, Australia.*

Luke Herbert et al.; "Using stochastic model checking to provision complex business services", 2012 IEEE in Proceedings of 14th International IEEE Symposium on High-Assurance Systems Engineering Chase 2012), pp. 98-105 (8 pages).

Luke Herbert et al., "Precise Quantitative Analysis of Probabilistic Business Process Model and Notation Workflows", Journal of Computing and Information Science in Engineering, Mar. 2013, vol. 13 (9 pages).

Japanese Office Action dated Oct. 16, 2018 for corresponding Japanese Patent Application No. 2014-240185, with English Translation, 6 pages.

* cited by examiner

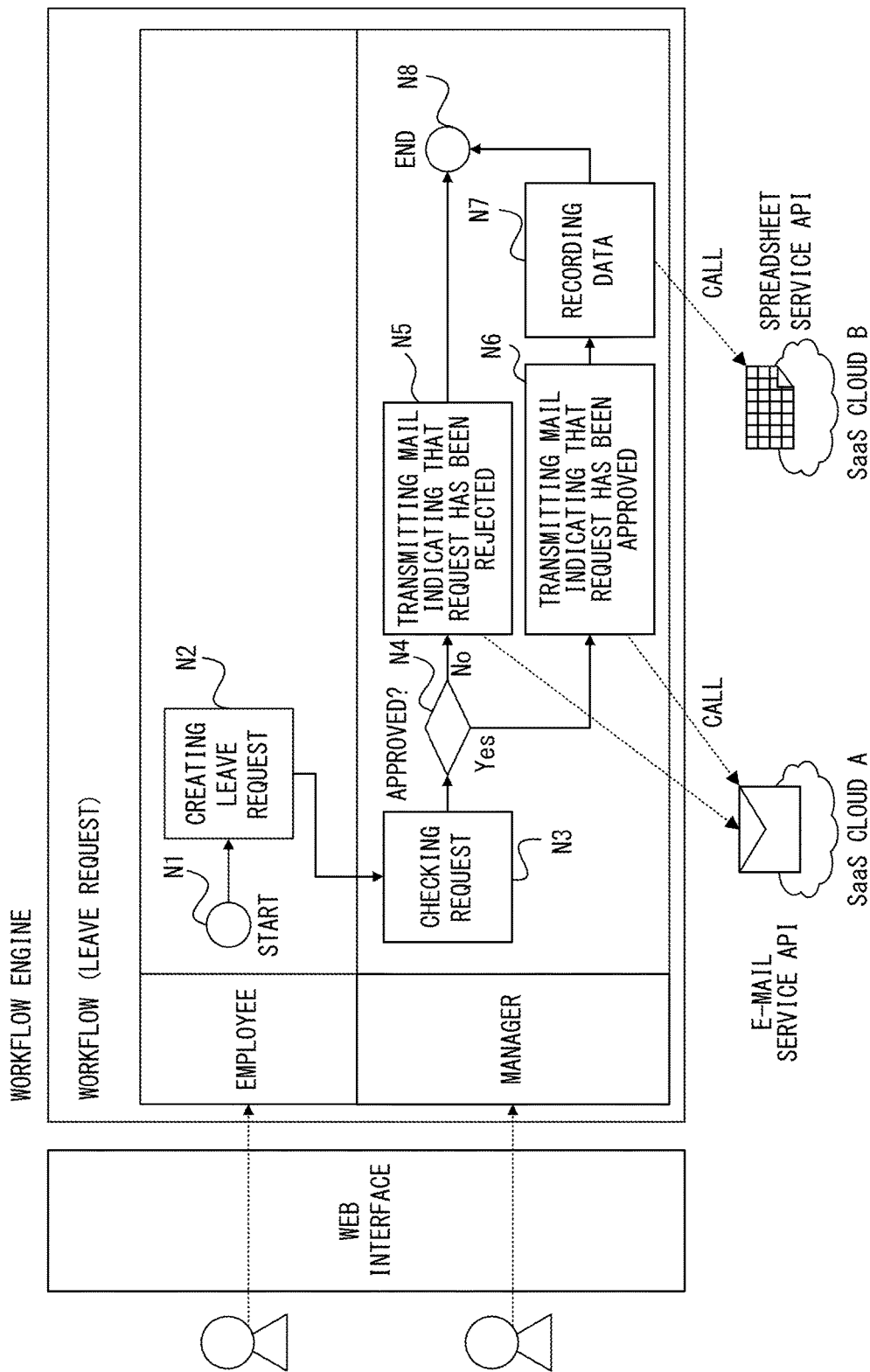
F I G. 1

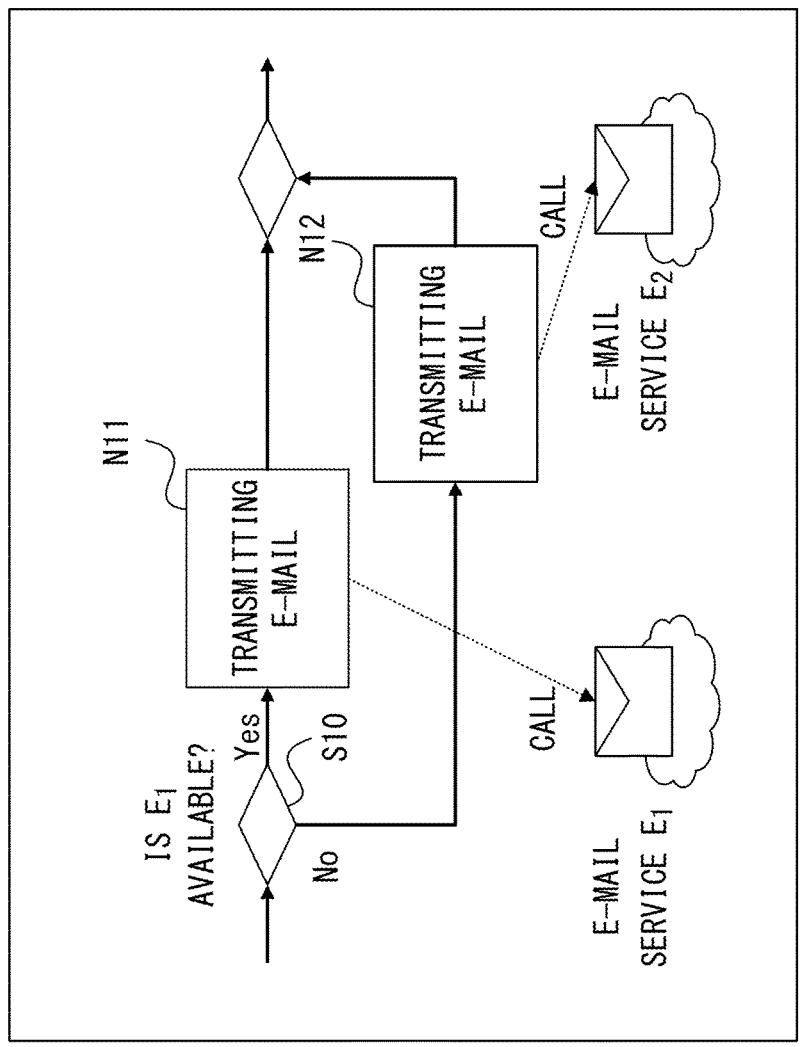
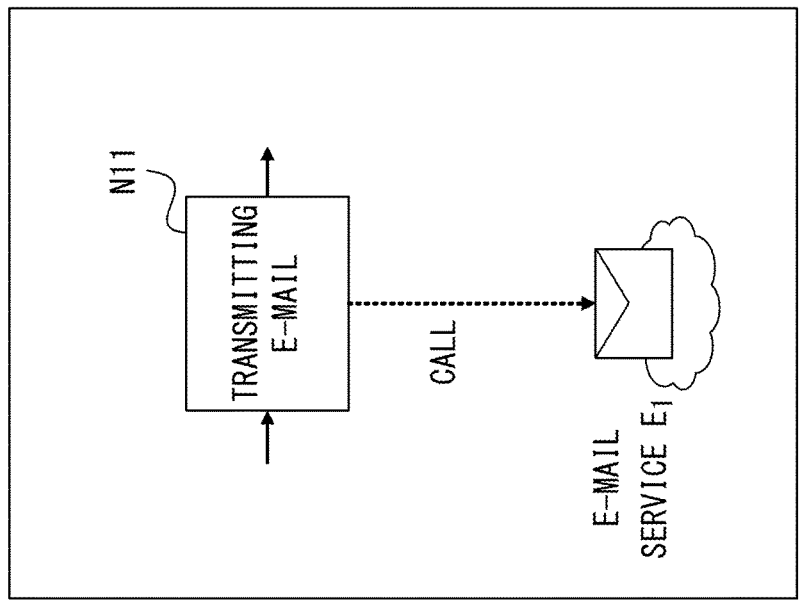
FIG. 2B
FIG. 2A

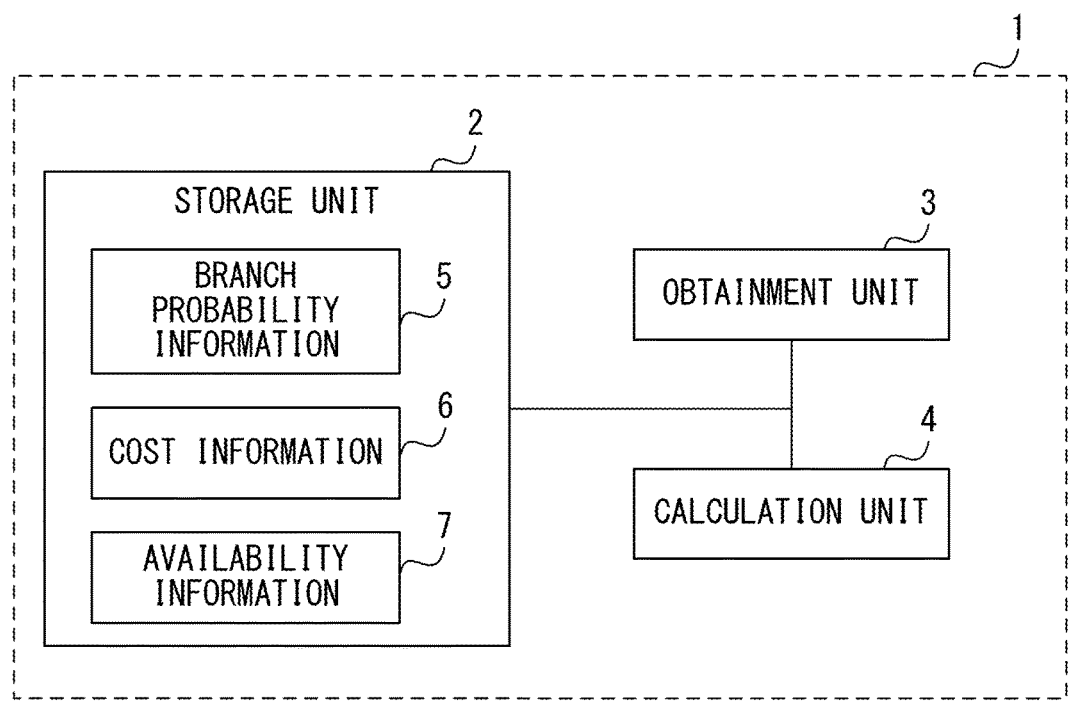
F I G. 4

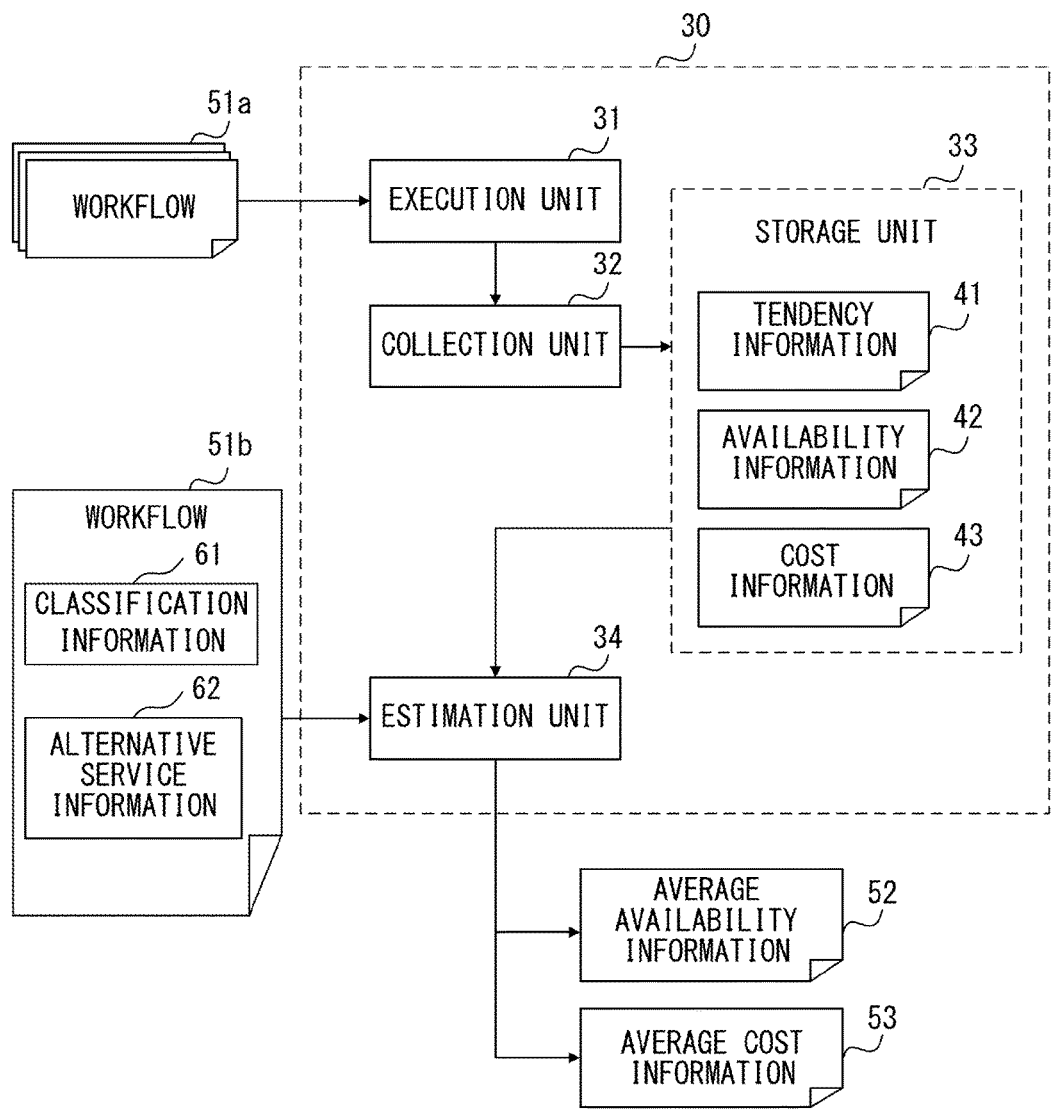
F I G. 5

| TARGET WORKFLOW | WORKFLOW CATEGORY | DETERMINATION NODE | APPROVER |
|---|---|---|---|
| LEAVE REQUEST | WORKING-RELATED | $n_4$ | Manager (MANAGER) |

61

F I G. 8

| SERVICE ID | ALTERNATIVE SERVICE ID |
|---|---|
| $e_1$ | $e_3$ |

| APPROVER | WORKFLOW CATEGORY | DETERMINATION | NUMBER OF INPUT TIMES | TOTAL NUMBER | RATIO |
|---|---|---|---|---|---|
| Executive (EXECUTIVE) | CONTRACT-RELATED | Yes | 95 | 100 | 0.95 |
| | | No | 5 | 100 | 0.05 |
| | WORKING-RELATED | Yes | 180 | 200 | 0.90 |
| | | No | 20 | 200 | 0.10 |
| Manager (MANAGER) | PURCHASE-RELATED | Yes | 95 | 100 | 0.95 |
| | | No | 5 | 100 | 0.05 |
| | WORKING-RELATED | Yes | 95 | 100 | 0.95 |
| | | No | 5 | 100 | 0.05 |

| ID | SERVICE | AVAILABILITY |
|---|---|---|
| $e_1$ | E-mail | 0.995 |
| $e_2$ | SPREADSHEET | 0.999 |
| $e_3$ | E-mail | 0.998 |

F I G. 1 1

F I G. 1 2

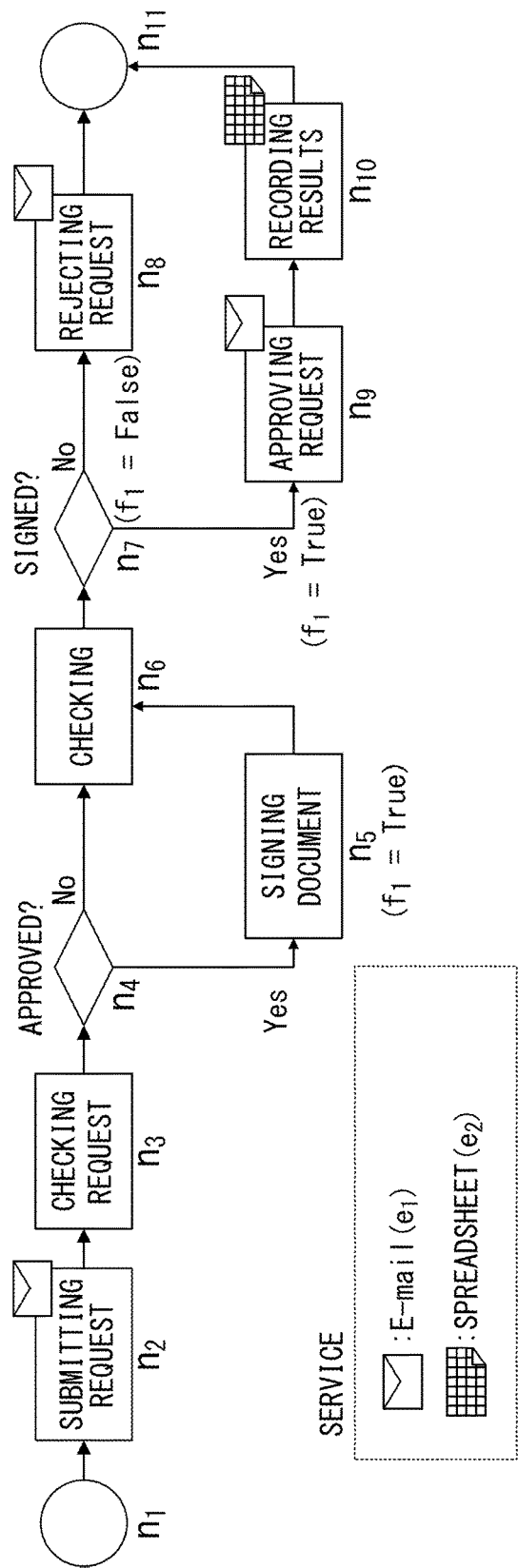
F I G. 13

```
                    USE PROBABILITY MODEL mdp formula e1_avail = 0.995;
  formula e2_avail = 0.999;
  formula e3_avail = 0.998;
  formula yes = 0.95;
  formula no  = 0.05;

formula e1_cost =1;
  formula e2_cost =2;
  formula e3_cost =3;

module w_vacation

// Node n1 to n11
    // n11: Success
    // n12: fails in n2 (e1)
    // n13: fails in n8 (e2)
    // n14: fails in n9 (e2)
    // n15: Service failure
    n  : [1..15] init 1;

// Flag f1
    f1 : bool init false;
```

FIG. 16A

CALCULATION VALUES (LOGICAL EXPRESSIONS)

(1) AVAILABILITY OF WORKFLOW
   PROBABILITY THAT WORKFLOW PROPERLY TERMINATES
   (REACHES n11) BY EXECUTION STEP 15
   $$Pmin=?[F<=15\ n=11]$$

(2) EXECUTION COST OF WORKFLOW
   AVERAGE COST BY EXECUTION STEP 15
   $$Rmax=?[C<=15]$$

(NOTE: SINCE THE NUMBER OF STATES IS 15, SEARCH IS LIMITED UP TO 15 STEPS)

⓵ ⟶ PROBABILITY MODEL CHECKING TOOL (1) AVAILABILITY OF WORKFLOW : 99.903%
(2) EXECUTION COST OF WORKFLOW : 3.93

FIG. 16C

INFORMATION PROCESSING METHOD

CROSS-REFERENCE TO RELATED APPLICATION

This application is based upon and claims the benefit of priority of the prior Japanese Patent Application No. 2014-240185, filed on Nov. 27, 2014, the entire contents of which are incorporated herein by reference.

FIELD

The embodiment discussed herein is related to an information processing method and an information processing program.

BACKGROUND

Diversified services such as E-mail (Electronic Mail), a spreadsheet and the like have been recently provided by cloud services. By combining such diversified cloud services with the use of a workflow engine, a business process using cloud services can be built at low cost in short time.

A workflow engine is software that assigns operations to a responsible person and a system in accordance with a workflow, and that sequentially executes tasks.

A workflow is information that defines a series of process procedures of business operations. The series of process procedures include contents of processes, and information indicating an execution order and a flow of the series of processes.

Contents of processes defined by a workflow include a process executed by using a cloud service such as Software as a Service (SaaS) or the like. Services provided by such a cloud service include diversified services such as E-mail, a spreadsheet and the like.

In the meantime, cloud services that provide functions similar to, for example, E-mail, a spreadsheet and the like are offered, for instance, by a plurality of vendors. Accordingly, in a design of a workflow, by way of example, for a process executed by using a cloud service, one of available cloud services of the same type is selected. As a criterion for selecting a cloud service intended to suitably design a business process, the cost and the availability of a cloud service to be selected are considered.

When a cloud service is selected, it is important to estimate the cost and the availability of the service. If a cloud service is selected without estimating the cost and the availability of the service when being designed, problems such as an excessive cost, low availability and the like can possibly come to the surface after the workflow is executed. In this case, the workflow needs to be redesigned or modified, leading to a waste of time and cost.

In a workflow, a plurality of cloud services having a similar function are sometimes used together so as to improve the availability. In this case, it also becomes important to estimate the degree of availability improved by using the cloud services together, and an additional cost incurred.

Techniques described in the following documents are known.

International Publication Pamphlet No. 2013/031129
International Publication Pamphlet No. 2011/018827
Luke Herbert and Robin Sharp, "Using stochastic model checking to provision complex business services," In proceedings of 14th International IEEE Symposium on High-Assurance Systems Engineering (HASE' 12), pp. 98-105, IEEE, 2012.

Luke Herbert and Robin Sharp, "Precise Quantitative Analysis of Probabilistic business Process Model and Notation Workflows," Journal of Computing and Information Science in Engineering, Vol. 13, 2013.

SUMMARY

According to an aspect of the embodiment, an information processing method includes, when receiving a workflow including a conditional branch and procedures, obtaining, by using a computer, branch probability information corresponding to a classification of the conditional branch included in the received workflow from a storage unit that stores the branch probability information, the branch probability information being calculated for each piece of classification information defined for the conditional branch included in the received workflow and indicating a probability that a condition has been satisfied in an executed conditional branch; obtaining, by using the computer, cost information and availability information that correspond to the procedure included in the received workflow from the storage unit that stores the cost information and the availability information, the cost information indicating a cost needed for a service provided by the procedure included in the workflow, and the availability information indicating availability of the service; calculating an execution probability of the procedure included in the received workflow on the basis of the obtained branch probability information, by using the computer; and calculating a probability that the received workflow properly or improperly terminates, and a cost needed to execute the received workflow by using the calculated execution probability of the procedure, the obtained cost information and the obtained availability information, by using the computer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates one example of a workflow.

FIGS. 2A and 2B are explanatory diagrams of a process for an alternative service in the workflow.

FIG. 4 is a block diagram illustrating functions of an information processing apparatus according to the embodiment.

FIG. 5 illustrates one example of a configuration of the information processing apparatus according to the embodiment.

FIG. 8 illustrates one example of classification information.

FIG. 9 illustrates one example of alternative service information.

FIG. 10 illustrates one example of tendency information.

FIG. 11 illustrates one example of availability information.

FIG. 12 illustrates one example of cost information.

FIG. 13 illustrates one example of a workflow in the embodiment.

FIGS. 16A-16C illustrate examples of a calculation of an average cost and average availability by using a probability model checking tool.

DESCRIPTION OF EMBODIMENT

Figure 3:
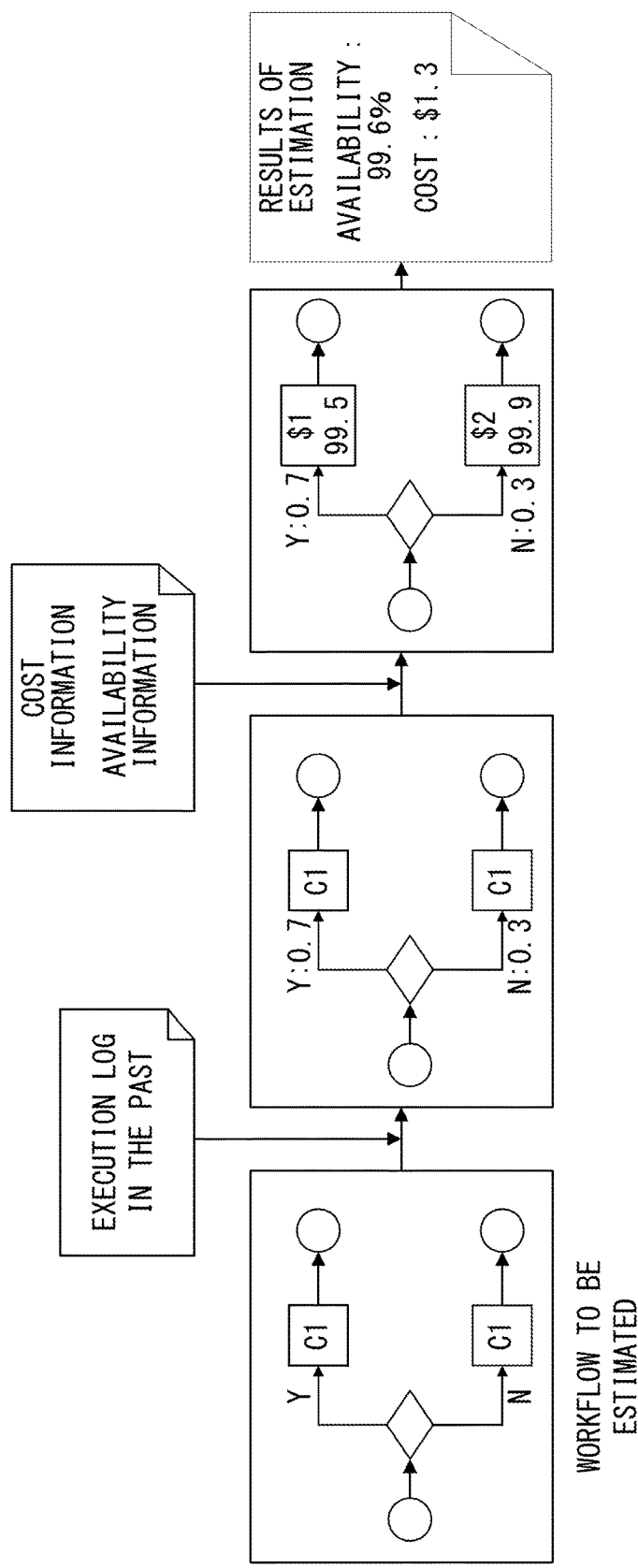
FIG. 3 illustrates a flow of a calculation of the availability and the cost of a workflow in an embodiment.

It is difficult to estimate the cost and the availability of a workflow in advance at the time of a design. This is because the workflow has a complicated structure such as a conditional branch, merging of process flows, and the like. Therefore, only if a diagram of the structure is viewed, it is difficult to identify the number of times that each cloud service is called.

An information processing apparatus according to an embodiment can provide study materials when a new workflow is created.

A workflow in the embodiment is initially described. FIG. 1 illustrates one example of the workflow. The workflow illustrated in FIG. 1 defines process procedures for a leave request.

In the workflow illustrated in FIG. 1, a plurality of nodes (N1 to N8) are connected with (directed) links. Each of the nodes is the unit of a process executed in the workflow. Moreover, each of the links that connect between nodes indicates an execution order of the nodes. Each of the nodes may be associated with information indicating a target person. The target person is a user who executes or checks a process of a corresponding node. In FIG. 1, the target persons is indicated as an "employee" or a "manager".

The target person inputs information used in the process of the corresponding node, for example, via a Web interface, and references information output in a process of a corresponding node. The target person may not always perform operations in each corresponding node.

In a process executed in each of the nodes, a service provided by a different system may be used. Examples of the service provided by the different system include a cloud service and the like. A node that calls and uses such a service (hereinafter referred to as a cloud service) provided by a different system is hereinafter referred to as a calling node. Specifically, N5, N6 and N7 illustrated in FIG. 1 are equivalent to calling nodes. N5 and N6 call a service of an SaaS cloud A, and N7 calls a service of an SaaS cloud B. The information processing apparatus that executes the processes of the nodes of the workflow and the different system are connected via a communication network or the like.

Some of the nodes included in the workflow accept an input from a target person, and decide a series of processes executed thereafter on the basis of the input information. Such nodes are hereinafter referred to as determination nodes. In the determination nodes, a condition (hereinafter referred to as a branch condition) used to determine a branch is predefined. When the determination node is executed, an input of information (hereinafter referred to as determination input information) corresponding to the branch condition from a target person of the determination node is accepted, and a series of processes to be executed thereafter is decided depending on whether the determination input information satisfies the branch condition.

Specifically, the node N4 illustrated in FIG. 1 is equivalent to the determination node. In the node N4, an input of the determination input information from the manager is accepted, and the process branches and makes a transition to either of the nodes N5 and N6 in accordance with whether the input determination input information satisfies the branch condition.

In the workflow illustrated in FIG. 1, N1 is a node that indicates the start of a process. N2 is a node that indicates a process with which an employee creates a leave request. N3 is a node that indicates a process with which the manager checks the leave request. N4 is a node that indicates a process with which the manager determines whether to approve the leave request, and that decides to which of the subsequent nodes N5 and N6 the process is to proceed in accordance with a result of the determination. N5 is a node indicating a process with which mail indicating that the leave request has been rejected is transmitted. N6 is a node indicating a process with which mail indicating that the leave request has been approved is transmitted. In N5 and N6, the E-mail service provided by the SaaS cloud A is called and used. N7 is a node indicating a process with which data indicating that the leave request has been approved is recorded. In N7, the spreadsheet service provided by the SaaS cloud B is called and used. N8 is a node indicating the end of the process.

The workflow may be represented in a form such as Business Process Modeling Notation (BPMN), Business Process Execution Language (BPEL), or the like.

Each of the nodes in the workflow may include information indicating the process of the local node, and identification information of a target person. Each of the links may include identification information of two nodes, and information indicating an execution order of the two nodes. A determination node may include information indicating a branch condition in addition to the information possessed by each of the nodes. A calling node may include identification information of a service called by each local node in addition to the information possessed by the local node.

The series of process procedures defined by the nodes in the workflow is executed by a workflow engine in an order according to the links between nodes, and results of decisions in the determination nodes.

In a cloud service used in a node, a payment of a charge is incurred in accordance with the number of times that the service is used, the amount of used data, or the like. Moreover, a cloud service sometimes becomes unavailable, namely, the availability of the cloud service is not always 100 percent. Moreover, the availability of the cloud service cannot be improved on a user side.

When a cloud service is used in a workflow, the availability of the whole of the workflow is influenced by the availability of the cloud service. The availability of the cloud service cannot be improved on the user side. However, the workflow is defined to make an alternative service available in preparation for the unavailability of the cloud service, leading to an improvement in the availability of the workflow itself.

FIGS. 2A and 2B are explanatory diagrams of a process for an alternative service in the workflow. FIG. 2A illustrates a node N11 indicating a process for transmitting E-mail. In N 11, an E-mail service E1 that provides an E-mail service is used. FIG. 2B indicates that the process for transmitting E-mail is executed by using the E-mail service E2 when the E-mail service E1 is unavailable. Namely, whether the E-mail service E1 is available is determined in the node N10 illustrated in FIG. 2B, the node N11 is executed when the E-mail service E1 is determined to be available, and a Node N12 is executed when the E-mail service E1 is determined to be unavailable. In the node N12, the E-mail service E2 that provides an E-mail service is used. The replacement process of a service is defined in a workflow in this way, so that the availability of the whole of the workflow can be improved.

A calculation of the availability and the cost of the whole of the workflow in this embodiment is described next. In this embodiment, a branch probability in a determination node of a workflow to be estimated is predicted on the basis of information indicating a determination tendency exhibited by a target person in a workflow executed in the past. The availability and the cost of the whole of the workflow to be estimated are calculated by using results of this prediction, and information indicating the availability and the cost of the cloud service.

FIG. 3 illustrates the flow of the calculation of the availability and the cost of the workflow in the embodiment. In FIG. 3, the determination tendency of a target person in an item, which is a branch condition in a determination node, is initially calculated on the basis of an execution log of a workflow executed in the past. The determination tendency is, for example, a tendency of a determination (an approval or a rejection) of the manager who executes an approval process. Next, a probability that the process branches in a determination node included in a definition of the workflow to be estimated is estimated on the basis of the calculated determination tendency. It can be also said that the probability that the process branches is a probability that each branched node subsequent to a determination node is executed.

An estimation value of a cost (hereinafter referred to as an average cost) needed in average when the workflow is executed is calculated on the basis of the estimated probability, and cost information indicating the cost of a service. The average cost is a total sum of products between a cost incurred in each node included in the workflow and a probability that the process makes a transition to the node. The cost incurred in a node may be that incurred at a point in time when a service is accessed regardless of whether the service is available, or may be that incurred after the service has been properly used.

Additionally, an estimation value of the availability (hereinafter referred to as average availability) of the whole of the workflow is calculated on the basis of the estimated probability, and availability information indicating the availability of a service. The average availability is a total sum of probabilities of a transition to a state where a process properly completes finally in the workflow. However, a factor that a transition is not made to the state where the process properly completes in the workflow is assumed to be caused by the unavailability of a service called in the workflow.

Functions of the information processing apparatus according to the embodiment are described next. FIG. 4 is a block diagram illustrating the functions of the information processing apparatus according to the embodiment. In FIG. 4, the information processing apparatus 1 includes a storage unit 2, an obtainment unit 3 and a calculation unit 4.

The storage unit 2 stores branch probability information 5 that is calculated for each piece of classification information defined for a conditional branch included in the received workflow, and that indicates a probability that a condition (branch condition) is satisfied in an executed conditional branch (a determination node). Moreover, the storage unit 2 stores cost information 6 indicating a cost needed for a service provided with a procedure included in the workflow, and availability information 7 indicating the availability of the service.

When the workflow including the conditional branch and the procedures has been received, the obtainment unit 3 obtains, from the storage unit 2, branch probability information 5 that corresponds to the classification of the conditional branch included in the received workflow. Moreover, the obtainment unit 3 obtains the cost information 6 and the availability information 7 that correspond to the procedure included in the received workflow.

The calculation unit 4 calculates an execution probability of the procedures included in the received workflow on the basis of the branch probability information 5 obtained by the obtainment unit 3. Then, the calculation unit 4 calculates a probability that the received workflow properly or improperly terminates and a cost needed to execute the received workflow by using the cost information 6 and the availability information 7 that have been obtained by the obtainment unit 3.

Additionally, the obtainment unit 3 obtains alternative information that describes a procedure alternative to that included in the received workflow.

Furthermore, the calculation unit 4 calculates an execution probability of the alternative procedure by using the branch probability information 5, the availability information 7 and the alternative information. Then, the calculation unit 4 calculates the probability that the received workflow properly or improperly terminates, and the cost needed to execute the received workflow by using the execution probability of the procedure, the execution probability of the alternative procedure, the cost information 6 and the availability information 7.

Still further, the classification information is classification information that corresponds to the identification information of a user who inputs information used to determine whether a condition of a conditional branch is satisfied.

The information processing apparatus 1 according to the embodiment can obtain information for studying an execution destination of a new workflow by using the use state of a different workflow. Namely, the information processing apparatus 1 can calculate estimation values of the cost and the availability of the whole of a workflow yet to be executed.

When a plurality of cloud services are called in one workflow, influences that the services respectively exert on the availability of the whole of the workflow cannot be correctly grasped unless a calling order of the services is accurately grasped. For example, when a service A (having the availability of 80 percent) and a service B (having the availability of 95 percent) are called in series in the workflow, the availability of the whole of the workflow cannot be improved to 80 percent or more even though the service B is replaced with a service C (having the availability of 99 percent). In contrast, the information processing apparatus 1 according to the embodiment calculates the availability of the whole of the workflow on the basis of a probability of a transition to a node in the workflow, and the availability of a service called by a node. Accordingly, the accuracy of the calculation of the availability of the whole of the workflow can be improved.

Additionally, in the embodiment, estimation values of the availability and the cost of the whole of the workflow are calculated by obtaining the tendency of information input in the past in a conditional branch for each classification defined for the conditional branch. Thus, the accuracy of the calculation of the estimation values of the cost and the availability of the whole of the workflow yet to be executed can be improved.

Furthermore, the information processing apparatus 1 according to the embodiment collectively calculates the estimation values of the cost and the availability. The availability of the whole of the workflow can be improved by increasing the cost. In contrast, the availability tends to drop if the cost is reduced. It is important to design a workflow by taking into account both the cost and the availability. In this embodiment, the estimation values of the cost and the availability can be collectively presented, so that more useful information for studying an execution destination of a new workflow can be provided.

Still further, in this embodiment, changes in the cost and the availability when a used service is altered or when a different service is attempted to be used as a backup can be calculated by variously combining a service or an alternative service used in a workflow to define them.

Still further, in the embodiment, identification information of a user can be used as a classification of a conditional branch. By calculating estimation values of the availability and the cost with the use of branch probability information that calculated for each classification, the accuracy of the calculation can be improved.

FIG. 5 illustrates one example of a configuration of the information processing apparatus according to the embodiment. In FIG. 5, the information processing apparatus 30 includes an execution unit 31, a collection unit 32, a storage unit 33 and an estimation unit 34.

The information processing apparatus 30 is one example of the information processing apparatus 1 illustrated in FIG. 4. The storage unit 33 is one example of the storage unit 2 illustrated in FIG. 4. The estimation unit 34 is one example of the obtainment unit 3 and the calculation unit 4 that are illustrated in FIG. 4.

The execution unit 31 obtains a workflow 51 (51a), and sequentially executes processes of the obtained workflow 51a. Specifically, the execution unit 31 is, for example, a workflow engine. The execution unit 31 may be configured, for example, by being included in another information processing apparatus connected to the information processing apparatus 30 via a communication network or the like, or may be implemented with a plurality of different information processing apparatuses.

The workflow 51 includes classification information 61 and alternative service information 62.

The classification information 61 is information indicating the classification of a determination node included in the workflow 51. Specifically, the classification information 61 is represented, for example, with the category of the workflow 51, identification information of a target person of a determination node, a combination of the above category and identification information, or the like.

The alternative service information 62 is information indicating a service that is called as an alternative service when a service called in a node is unavailable. Specifically, the alternative service information 62 includes, for example, identification information of a service, and that of an alternative service called when the service is unavailable.

The alternative service information 62 is one example of the alternative information.

Note that the classification information 61 and the alternative service information 62 may be implemented as information independent from the workflow 51.

The collection unit 32 keeps a log of the workflow 51 executed by the execution unit 31. Then, the collection unit 32 calculates a ratio of determination input information input in a determination node for each classification of the determination node on the basis of the kept log, and stores the calculated ratio in the storage unit 33 as tendency information 41.

The storage unit 33 stores the tendency information 41, availability information 42 and the cost information 43. The tendency information 41 is one example of the branch probability information 5 illustrated in FIG. 4. The availability information 42 is one example of the availability information 7 illustrated in FIG. 4. The cost information 43 is one example of the cost information 6 illustrated in FIG. 4.

The tendency information 41 is information indicating the tendency of determination input information that is input by a target person in a determination node of a workflow 51 executed in the past. Specifically, the tendency information 41 is a ratio of determination input information input in the determination node for each classification of the determination node. The tendency information 41 is obtained by the collection unit 32, and stored or updated in the storage unit 33. Details of the tendency information 41 and the classification of the determination node will be described later with reference to FIG. 10.

The availability information 42 is information indicating the availability of each service used in the workflow 51. The availability information 42 is obtained by the collection unit 32, and stored or updated in the storage unit 33. Details of the availability information 42 will be described later with reference to FIG. 11.

The cost information 43 is information indicating the cost of each service used in the workflow 51. The cost information 43 is obtained by the collection unit 32, and stored or updated in the storage unit 33. Details of the cost information 43 will be described later with reference to FIG. 12.

The estimation unit 34 obtains a workflow 51 (51b) to be estimated, and calculates and outputs average availability information 52 and average cost information 53 on the basis of the tendency information 41, the availability information 42 and the cost information 43. Details of the process of the estimation unit 34 will be described later with reference to FIG. 7.

Figure 6:
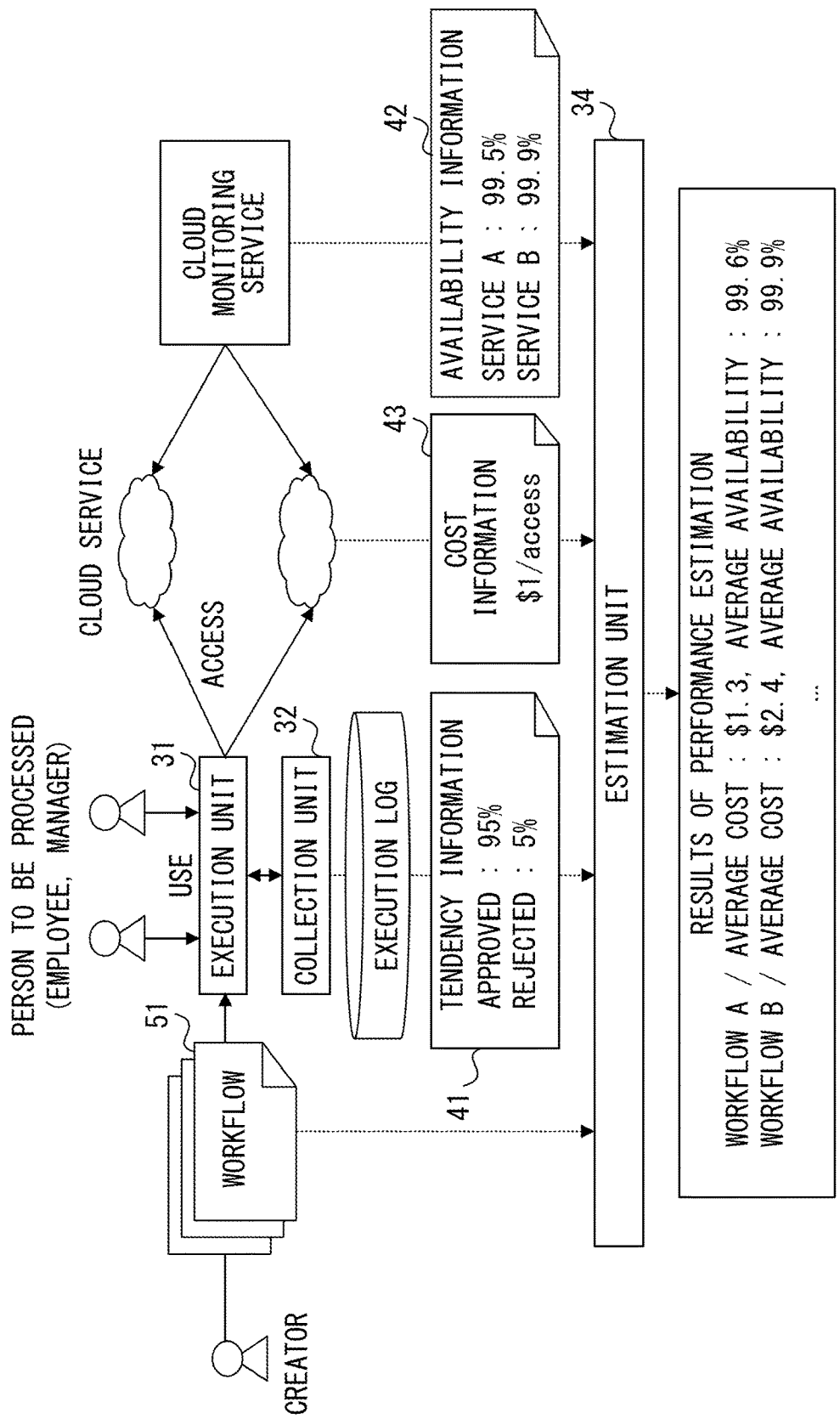
FIG. 6 is an explanatory diagram of a flow of the whole of a calculation process in the embodiment.

One example of a configuration of an information processing system according to the embodiment is described next. FIG. 6 is an explanatory diagram of a flow of the whole of the calculation process in the embodiment.

In FIG. 6, a creator creates a workflow 51. The created workflow 51 is input to the execution unit 31.

The execution unit 31 obtains the workflow 51 created by the creator, and sequentially executes processes of nodes defined in the workflow 51 in accordance with the obtained workflow 51. The execution unit 31 sometimes accepts an input from a target person in the process of a node. Especially, when a determination node is executed, the execution unit 31 obtains determination input information from a target person of the determination node. The determination input information may be obtained in various ways from the target person. For example, the execution unit 31 may present options of the determination input information to the target person, and information that the target person selects from among the options may be obtained. Moreover, the execution unit 31 sometimes uses a cloud service in the process of the node.

The collection unit 32 keeps and records an execution log of the workflow 51 executed by the execution unit 31. Moreover, the collection unit 32 obtains determination input information input in a determination node when the determination node is executed. Next, the collection unit 32 classifies the determination node on the basis of classification information 61 included in the workflow 51, or a specified rule. Then, the collection unit 32 stores, in the storage unit 33, information about the determination input information input in the determination node on the basis of the classification of the determination node as tendency information.

A criterion for classifying a determination node may be that according to classification of the workflow 51 including the determination node, or the classification of a target person of the determination node. The classification of the workflow 51 may be, for example, that according to a purpose of the workflow 51. The classification of the target person may be, for example, that according to a job title of the target person.

A cloud provider that provides a cloud service announces a charge (cost information 43) of each cloud service to a user. The cloud service is charged in various ways. For example, the cloud service is charged on a pay-per-use basis, or charged each time the service is used for a specified amount of time or a specified capacity. The information processing apparatus 30 may obtain the cost information 43 from a cloud service provider, and may store the information in the storage unit 33.

A cloud monitoring service monitors the running state of a cloud service provided by a cloud provider, records the availability information 42 indicating the availability of the cloud service, and provides a user of the cloud service with the information. The cloud monitoring service may be a third-party service independent from the cloud provider. Moreover, functions of the cloud monitoring service may be provided by a CPU of the information processing apparatus 30. The information processing apparatus 30 may obtain the availability information 42 from the cloud monitoring service, and may store the obtained availability information 42 in the storage unit 33.

The estimation unit 34 calculates and outputs estimation values of the average availability and the average cost of the workflow 51 by using the workflow 51, the tendency information 41, the availability information 42 and the cost information 43.

Figure 7:
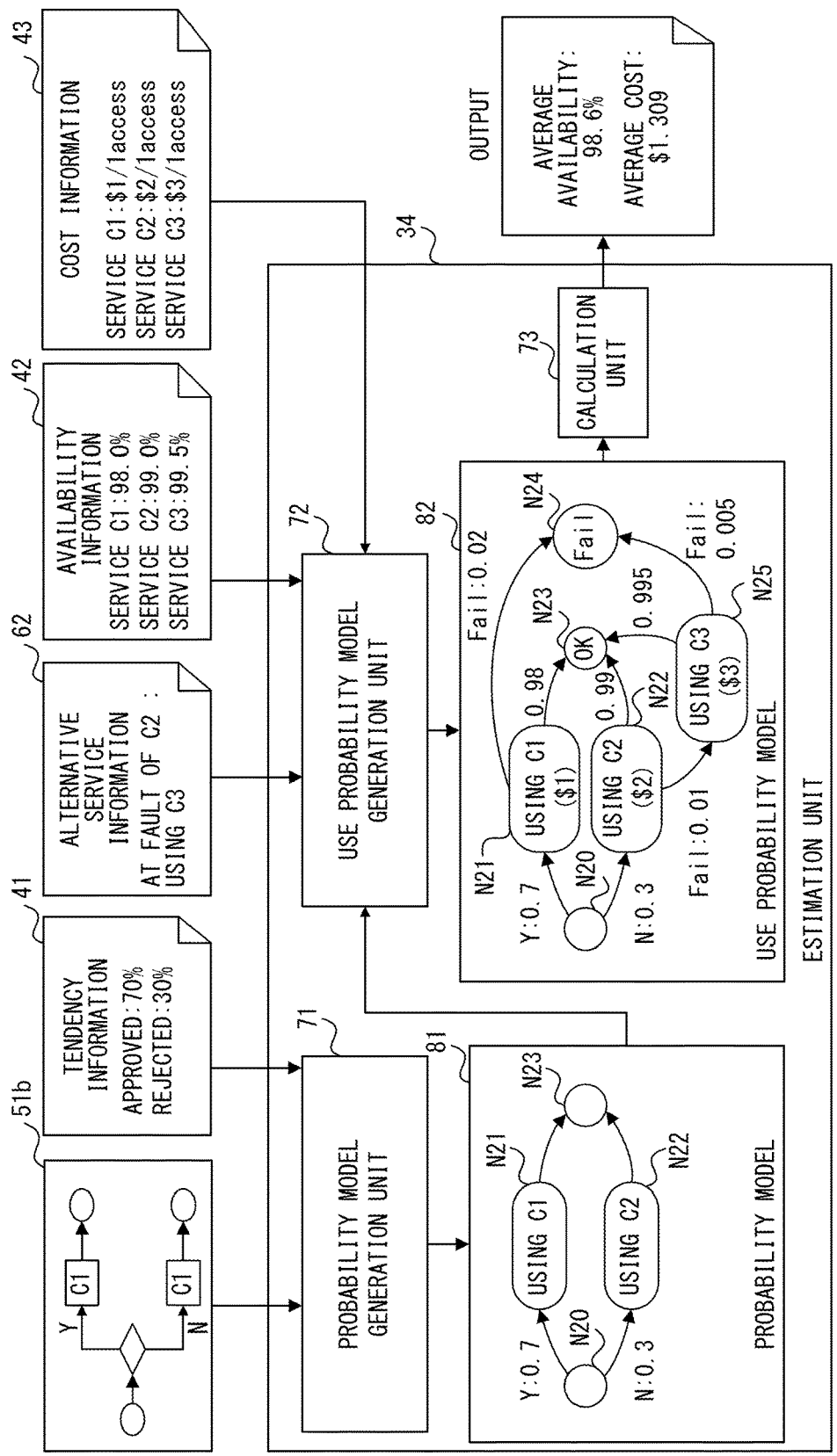
FIG. 7 illustrates one example of a configuration of an estimation unit.

Details of the estimation unit 34 are described next. FIG. 7 illustrates one example of a configuration of the estimation unit 34.

In FIG. 7, the estimation unit 34 accepts, as inputs, the workflow 51b, the tendency information 41, the alternative service information 62, the availability information 42 and the cost information 43, and calculates and outputs estimation values of the average availability and the average cost of the workflow 51. The estimation unit 34 includes a probability model generation unit 71, a use probability model generation unit 72 and a calculation unit 73. In the example illustrated in FIG. 7, the workflow 51 and the alternative service information 62 are separately illustrated. However, the alternative service information 62 may be included in the workflow 51.

The probability model generation unit 71 generates a probability model 81 on the basis of the workflow 51 and the tendency information 41. The probability model 81 is information obtained by adding, to the workflow 51, information indicating an estimation value of a probability that a branch condition is satisfied in each determination node included in the workflow 51. Namely, the probability model 81 includes information indicating each node of the workflow 51, information indicating each link, and an estimation value of the probability that a branch condition is satisfied in each determination node. In other words, the probability that a branch condition is satisfied in each determination node is a probability that a process branches in each determination node. Note that a model into which a probability is put in a state transition such as a stochastic Markov Decision Process (MDP) or the like may be used as the probability model 81. A specific example of the probability model 81 will be described later with reference to FIG. 14.

After the probability model generation unit 71 has generated the probability model 81, it outputs the generated probability model 81 to the use probability model generation unit 72.

The use probability model generation unit 72 generates a use probability model 82 on the basis of the probability model 81, the alternative service information 62, the availability information 42 and the cost information 43. The use probability model 82 is information obtained by adding, to the probability model 81, alternative information of a service called by a calling node included in the workflow 51, information indicating the availability of each service, and information indicating the cost of each service. Namely, the use probability model 82 includes information indicating each node, information indicating each link, an estimation value of the probability that a branch condition is satisfied in each determination node, and identification information of a service alternative to a service called by each calling node. The use probability model 82 further includes the availability information of a service called by each calling node, and the cost information of the service called by each calling node. It can be said that the use probability model 82 includes information indicating a probability of a transition to each node. This is because the use probability model 82 includes the estimation value of the probability that a branch condition is satisfied in each determination node, and the availability information of the service called by each calling node. A specific example of the use probability model 82 will be described later with reference to FIG. 15. Then, the use probability model generation unit 72 outputs the generated use probability model 82 to the calculation unit 73.

The calculation unit 73 calculates and outputs the average availability and the average cost on the basis of the use probability model 82.

In the calculation of the average availability, the calculation unit 73 calculates a transition probability of each path reaching from a node in which a process is started to a node in which the process is normally terminated in the use probability model 82, and calculates a total sum of calculated transition probabilities of the paths. The average availability in the use probability model 82 illustrated in FIG. 7 is a total sum of the probabilities of transitions from the node in which the process is started to the node (N23) in which the process is properly completed in the use probability model 82.

The transition probability of the path 1 is "0.7×0.98=0.686". The transition probability of the path 2 is "0.3×0.99=0.397". The transition probability of the path 3 is "0.3×0.01×0.995=0.002985". Accordingly, the average availability is "0.686+0.397+0.002985=0.985985".

In the calculation of the average cost, the calculation unit 73 calculates a total sum of products between a cost incurred in each of the calling nodes (N21, N22, N25) in the use probability model 82, and a probability that the cost is incurred.

The cost of a service is calculated in a case where the service is attempted to be called regardless of whether the service is available, or in a case where the cost is incurred when the service is available.

The case where the cost is incurred when the service is attempted to be called regardless of whether the service is available is initially described. In this case, the cost is incurred at a stage where a transition is made to a calling node. Therefore, the probability that the cost of each service is incurred is identical to that of the transition to the calling node calling the service. Accordingly, in the calculation of the average cost, the calculation unit 73 calculates a total sum of products between the cost incurred in each of the calling nodes (N21, N22, N25) in the use probability model 82 and a probability of a transition to each corresponding calling node.

In the use probability model 82 illustrated in FIG. 7, the cost of the service called in N21 is "$1", and the probability of a transition to N21 is "0.7". The cost of the service called in N22 is "$2", and the probability of a transition to N22 is "0.3". The cost of the service called in N25 is "$3", and the probability of a transition to N25 is "0.3×0.01". Accordingly, the average cost is "1×0.7+2×0.3+3×0.3×0.01=1.309", namely, "$1.309".

The case where the cost is incurred when the service is available is described next. In this case, the probability that the cost of each service is incurred is a product between the probability of a transition to a calling node of each service and the availability of each service. Accordingly, the calculation unit 73 calculates a total sum of products between the cost incurred in each of the nodes (N21, N22, N25) in the use probability model 82, the probability of a transition to each corresponding calling node, and the value of the availability of each corresponding service.

In the use probability model 82 illustrated in FIG. 7, the cost and the availability of the service called in N21 are respectively "$1" and "0.98", and the probability of the transition to N21 is "0.7". The cost and the availability of the service called in N22 are respectively "$2" and "0.99, and the probability of the transition to N22 is "0.3". The cost and the availability of the service called in N25 are respectively "$3" and "0.995", and the provability of the transition to N25 is "0.3×0.01". Accordingly, the average cost is "1×0.7×0.98+2×0.3×0.99+3×0.3×0.01×0.995=1.288995", namely, "$1.288955".

The classification information 61 included in the workflow 51 is described next. The classification information is information indicating the classification of a determination node included in the workflow 51. FIG. 8 illustrates one example of the classification information 61.

In FIG. 8, the classification information 61 is information that makes an association among a "target workflow", a "workflow category", a "determination node" and an "approver".

The "target workflow" is identification information of a workflow 51 to be estimated. The "workflow category" is identification information of a group to which the workflow to be estimated belongs. The "determination node" is identification information of a determination node included in the workflow 51 to be estimated. The "approver" is identification information of a target person of the node indicated by the "determination node". Note that the "approver" may be identification information of a group to which the target person belongs. Moreover, the embodiment assumes that the information indicating the classification of a determination node is information indicated by a combination of the "workflow category" and the "approver". By using the branch probability information calculated for each classification indicated by the combination of the "workflow category" and the "approver", the accuracy of the calculation of estimation values of the availability and the cost can be improved.

Figure 9:
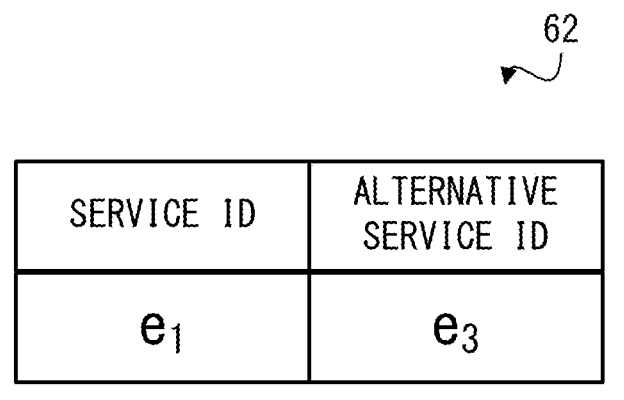

The alternative service information 62 included in the workflow 51 is described next. The alternative service information 62 is information that makes an association between identification information of a service called in a calling node and that of an alternative service called when the service is unavailable. FIG. 9 illustrates one example of the alternative service information 62.

In FIG. 9, the alternative service information 62 is information that makes an association between data items such as a "service ID" and an "alternative service ID".

The "service ID" is identification information of a service called in a calling node. The "alternative service ID" is identification information of a service called as an alternative when the service indicated by the "service ID" is unavailable. A service indicated by the "service ID" and that indicated by the "alternative service ID" may be services respectively providing functions of the same type, or may be services of the same type.

The example illustrated in FIG. 9 represents that a service having identification information "$e_3$" is called when a service having identification information "$e_1$" is unavailable.

In the embodiment, an alternative service is defined for each service. However, an alternative service may be defined for each calling node. In this case, the alternative service information 62 may be information that makes an association between identification information of a calling node and that of a service called as an alternative when the service called in the calling node is unavailable.

The tendency information 41 is described next. As the tendency information 41, information indicating the classification of a determination node, determination input information, and a ratio of an input of corresponding determination input information are associated with one another and stored. FIG. 10 illustrates one example of the tendency information 41.

In FIG. 10, as the tendency information 41, data items such as an "approver", a "workflow category", a "determination", "number of input times", a "total number" and a "ratio" are associated with one another and stored. The "approver" is identification information of a target person. The "approver" may be identification information of a group to which a target person belongs. The "workflow category" is identification information of a group to which the workflow 51 belongs. The "determination" indicates determination input information. The "number of input times" indicates the number of times that the target person indicated by the "approver" inputs the determination input information indicated by the "determination" in a determination node of the workflow 51 that belongs the group indicated by the "workflow category". The "total number" indicates a total number of times that the target person indicated by the "approver" inputs the determination input information in the determination node of the workflow 51 that belongs the group indicated by the "workflow category". The "ratio" indicates a ratio at which the target person indicated by the "approver" inputs the determination input information indicated by the "determination" in the determination node of the workflow 51 that belongs to the group indicated by the "workflow category". Note that the "ratio" is a value obtained by dividing the "number of input times" of a corresponding record by the "total number". It can be also said that the "ratio" is, in other words, a probability that a branch condition is satisfied in a determination node of the workflow 51 belonging to the group indicated by the "workflow category".

The example illustrated in FIG. 10 represents, for example, that the ratio at which an "Executive" inputs determination input information "YES" in a determination node of a "contract-related" workflow 51 is "0.95", and that the ratio at which the "Executive" inputs determination input information "NO" is "0.05".

The availability information 42 is described next. As the availability information 42, identification information of a service used in the workflow 51 and information indicating the availability of the service are associated with each other and stored.

FIG. 11 illustrates one example of the availability information 42. In FIG. 11, as the availability information 42, data items such as an "ID", a "service" and "availability" are associated with one another and stored.

The "ID" is identification information for uniquely identifying a service. This identification information is uniquely defined, for example, in accordance with content of a service to be provided, or a provider that provides a service. The "service" is information indicating content provided by the service. The "availability" is information indicating the availability of the service. Note that the availability information 42 may not include the data entry "service".

The example illustrated in FIG. 11 represents that the availability of a service that has identification information "$e_1$" and provides a service "E-mail" is "0.995".

The cost information 43 is described next. As the cost information 43, identification information of a service used in the workflow 51 and information indicating the cost of the service are associated with each other and stored.

FIG. 12 illustrates one example of the cost information 43. In FIG. 12, as the cost information 43, data items such as an "ID", a "service" and "cost" are associated with one another and stored.

The "ID" is identification information for uniquely identifying a service. The "service" is information indicating content of the service indicated by the "ID". The "cost" is information indicating the cost of the service indicated by the "ID". Note that the cost information 43 may not include the data entry "service". Moreover, the "ID" and the "service" that are illustrated in FIG. 12 may respectively correspond to the "ID" and the "service" that are illustrated in FIG. 11.

In the example illustrated in FIG. 12, a cost incurred per service is indicated as the "cost". The example represents that the usage cost of the service that has the identification information "$e_1$" and provides the service "E-mail" is "1".

An example where the average availability and the average cost of the workflow 51 are calculated is described in detail next by taking, as an example, the workflow 51 illustrated in FIG. 13. This description assumes that the tendency information 41, the availability information 42 and the cost information 43 are those illustrated in FIGS. 10, 11 and 12. This description also assumes that the classification information 61 and the alternative service information 62 included in the workflow 51 are those illustrated in FIGS. 8 and 9.

The workflow 51 illustrated in FIG. 13 is a workflow of a leave request. Specifically, the following process is specifically defined in the workflow 51. Namely, when the workflow 51 has been started ($n_1$), the employee submits a leave request to the manager by mail ($n_2$). Next, the manager checks content of the request ($n_3$), and decides to approve or reject the request ($n_4$). When the manager approves the request ("YES" in $n_4$), he or she signs the document for an approval ($n_5$). Then, the manager checks a result of the request ($n_6$). Next, whether the document has been signed for the approval is determined ($n_7$). When the document has not been signed ("NO" in $n_7$), a result such that the request has been rejected is mailed to the person who submitted the request (the employee) ($n_8$). In the meantime, when the document has been signed for the approval ("YES" in $n_7$), a result such that the request has been approved is mailed to the person (employee) who submitted the request ($n_9$), and information of the leave is recorded on a spreadsheet ($n_{10}$). Then, the workflow 51 is terminated ($n_{11}$).

In the workflow 51, the determination node is $n_4$. A branch condition of the determination node $n_4$ is that determination input information indicates an "approval". In the determination node $n_4$, information indicating either an approval or a rejection is obtained from the manager as determination input information. Then, whether the determination input information satisfies the branch condition is determined.

In the example illustrated in FIG. 13, the determination node $n_4$ is classified on the basis of the category of the workflow 51 and a target person of $n_4$. As illustrated in FIG. 8, the category of the workflow 51 illustrated in FIG. 13 is "working-related", and the target person of $n_4$ is the "manager".

Additionally, in the workflow 51, calling nodes are $n_2$, $n_8$, $n_9$ and $n_{10}$. In $n_2$, $n_8$ and $n_9$ of the workflow 51, the mail service $e_1$ is used. Moreover, the spreadsheet service $e_2$ is used in $n_{10}$.

Note that a variable $f_1$ is a flag for storing a result such that the leave request has been approved in $n_5$.

Details of a process with which the calculation unit 73 calculates the average availability information 52 and the average cost information 53 when the workflow 51 illustrated in FIG. 13 is recognized as an estimation target are described with reference to FIGS. 14 to 16.

After the probability model generation unit 71 of the calculation unit 73 has obtained the workflow 51 illustrated in FIG. 13, it initially generates a probability model 81 on the basis of the workflow 51 and the tendency information 41.

In the generation of the probability model 81, the probability model generation unit 71 initially obtains a workflow 51 to be estimated and the tendency information 41. Next, the probability model generation unit 71 extracts the determination node $n_4$ included in the workflow 51, and identifies the classification of the extracted determination node $n_4$. The classification of the determination node $n_4$ is indicated by the category of the workflow 51 "working-related", and information of a target person "manager".

Then, the probability model generation unit 71 obtains information indicating the ratio of input determination input information in a determination node of the same classification as the identified one from the tendency information 41. Namely, the probability model generation unit 71 extracts a record in which the "workflow category" and the "approver" are respectively "working-related" and the "manager" in the tendency information 41 illustrated in FIG. 10. Then, the probability model generation unit 71 obtains information indicating that the "ratios" of "YES" and "NO" of the "determination" are respectively "0.95" and "0.05".

Next, the probability model generation unit 71 generates the probability model 81 by adding, to the workflow 51, the obtained information about the ratio of the determination input information as an estimation value of the probability that a branch condition is satisfied in the determination node.

Figure 14:
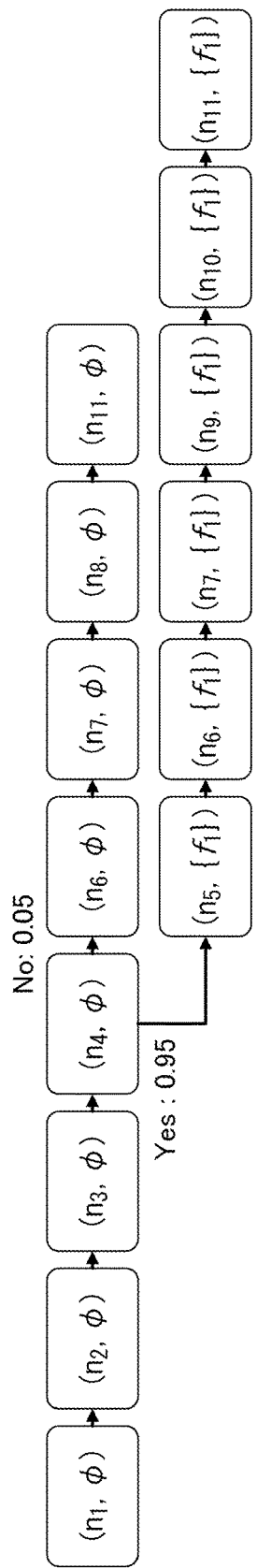
FIG. 14 illustrates one example of a probability model.
Figure 15:
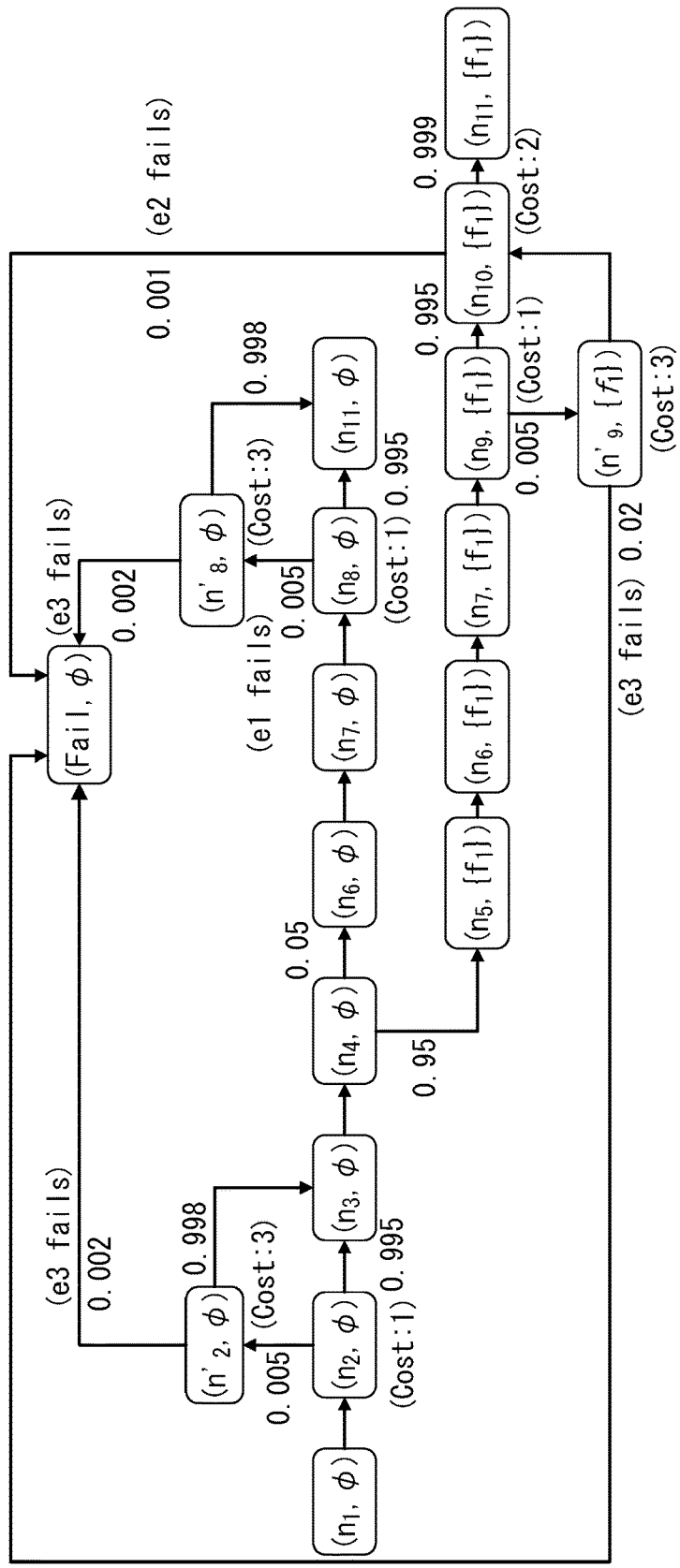
FIG. 15 illustrates one example of a use probability model.

FIG. 14 illustrates one example of the probability model 81. In FIG. 14, the probability model 81 represents the state of the workflow 51 as a pair of ("each node of the workflow", "a flag validated in the state"). Namely, there is no validated flag, for example, in the state of the node $n_2$. Therefore, the node $n_2$ is represented as ($n_2$, $\phi$). Since the flag $f_1$ is validated in the state of the node $n_5$, the node $n_5$ is represented as (n5, $\{f_1\}$).

Additionally, a state transition of the workflow 51 in the probability model 81 is represented by a link (ordinal relationship) between nodes, and an estimation value of the probability that a branch condition is satisfied in a determination node. The probability model 81 illustrated in FIG. 14 represents that the estimation value of the probability that a branch condition is satisfied in the determination node $n_4$ is "0.95".

Then, the probability model generation unit 71 outputs the generated probability model 81 to the use probability model generation unit 72.

The use probability model generation unit 72 generates a use probability model 82 by using the probability model 81, alternative service information 62, availability information 42 and cost information 43. FIG. 15 illustrates one example of the use probability model 82.

In the generation of the use probability model 82, the use probability model generation unit 72 initially obtains the probability model 81 and the alternative service information 62. Next, the use probability model generation unit 72 identifies calling nodes that correspond to an alternative service among nodes of the probability model 81 on the basis of the alternative service information 62.

In the example illustrated in FIG. 14, calling nodes that correspond to the alternative service $e_3$ are the nodes using the service $e_1$, namely, the nodes $n_2$, $n_8$ and $n_9$.

Next, the use probability model generation unit 72 adds, to the probability model 81, the nodes that call the alternative service of the identified calling nodes $n_2$, $n_8$ and $n_9$.

In the example illustrated in FIG. 14, respectively for the nodes $n_2$, $n_8$ and $n_9$, the nodes $n'_2$, $n'_8$ and $n'_9$ that call the service $e_3$ are added when the service $e_1$ is unavailable.

Next, the use probability model generation unit 72 adds, to the probability model 81, information about the availability of the service called by the calling nodes on the basis of the availability information 42.

In the availability information 42 illustrated in FIG. 11, the availabilities of the services $e_1$, $e_2$ and $e_3$ are respectively "0.995", "0.999" and "0.998". Moreover, in the use probability model 82 illustrated in FIG. 15, the nodes $n_2$, $n_8$ and $n_9$ that use the service $e_1$ respectively make a transition to $n_3$, $n_{11}$ and $n_{10}$ when the service $e_1$ is available. Accordingly, links between the nodes $n_2$ and $n_3$, between the nodes $n_8$ and $n_{11}$ and between the nodes $n_9$ and $n_{10}$, "0.995" is represented as a transition probability in the use probability model 82. In the meantime, the nodes $n_2$, $n_8$ and $n_9$ respectively make a transition to the nodes $n'_2$, $n'_8$ and $n'_8$ when the service $e_1$ is unavailable. Accordingly, in the use probability model 82, "0.005" is represented as a transition probability in links between the nodes $n_2$ and $n'_2$, between the nodes $n_8$ and $n'_8$, and between the nodes $n_9$ and $n'_9$. When the service is available, the calling nodes $n_{10}$, $n'_2$, $n'_8$ and $n'_9$ that have no alternative service respectively make a transition to the nodes $n_{11}$, $n_3$, n11 and $n_{10}$. Accordingly, in the use probability model 82, "0.999" is represented as a transition probability in a link between the nodes $n_{10}$ and $n_{11}$. Moreover, "0.998" is represented as a transition probability in links between the nodes $n'_2$ and $n_3$, between $n'_8$ and $n_{11}$, and between $n'_9$ and $n_{10}$. In contrast, when the service is unavailable, the nodes $n_{10}$, $n'_2$, $n'_8$ and $n'_9$ make a transition to a node Fail, and the workflow 51 abnormally terminates. Accordingly, in the use probability model 82, "0.001" is represented as a transition probability in a link between the node $n_{10}$ and the node Fail. Moreover, "0.002" is represented as a transition probability in links between the node $n'_2$ and the node Fail, between $n'_8$ and the node Fail, and between the node $n'_9$ and the node Fail.

Next, the use probability model generation unit 72 adds, to the probability model 81, information about the cost of the services called by the calling nodes on the basis of the cost information 43.

In the cost information 43 illustrated in FIG. 12, the availabilities of the services $e_1$, $e_2$ and $e_3$ are respectively represented as "1", "2" and "3. In this case, in the use probability model 82 illustrated in FIG. 15, the cost of the nodes $n_2$, $n_8$ and $n_9$ that use the service $e_1$ is represented as "1". Moreover, the cost of the node $n_{10}$ that uses the service $e_2$ is indicated as "2". Additionally, the cost of the node $n_{10}$ that uses the service $e_3$ is represented as "3".

In this way, the use probability model generation unit 72 generates the use probability model 82. After the use probability model generation unit 72 has generated the use probability model 82, it outputs the generated use probability model 82 to the calculation unit 73.

The calculation unit 73 calculates an average cost and average availability on the basis of the use probability model 82. A method of the calculation is that described with reference to FIG. 7. The calculation unit 73 may calculate the average cost and the average availability, for example, by using a use probability model checking tool such as PRISM or the like, or a simulator.

Figure 16B:
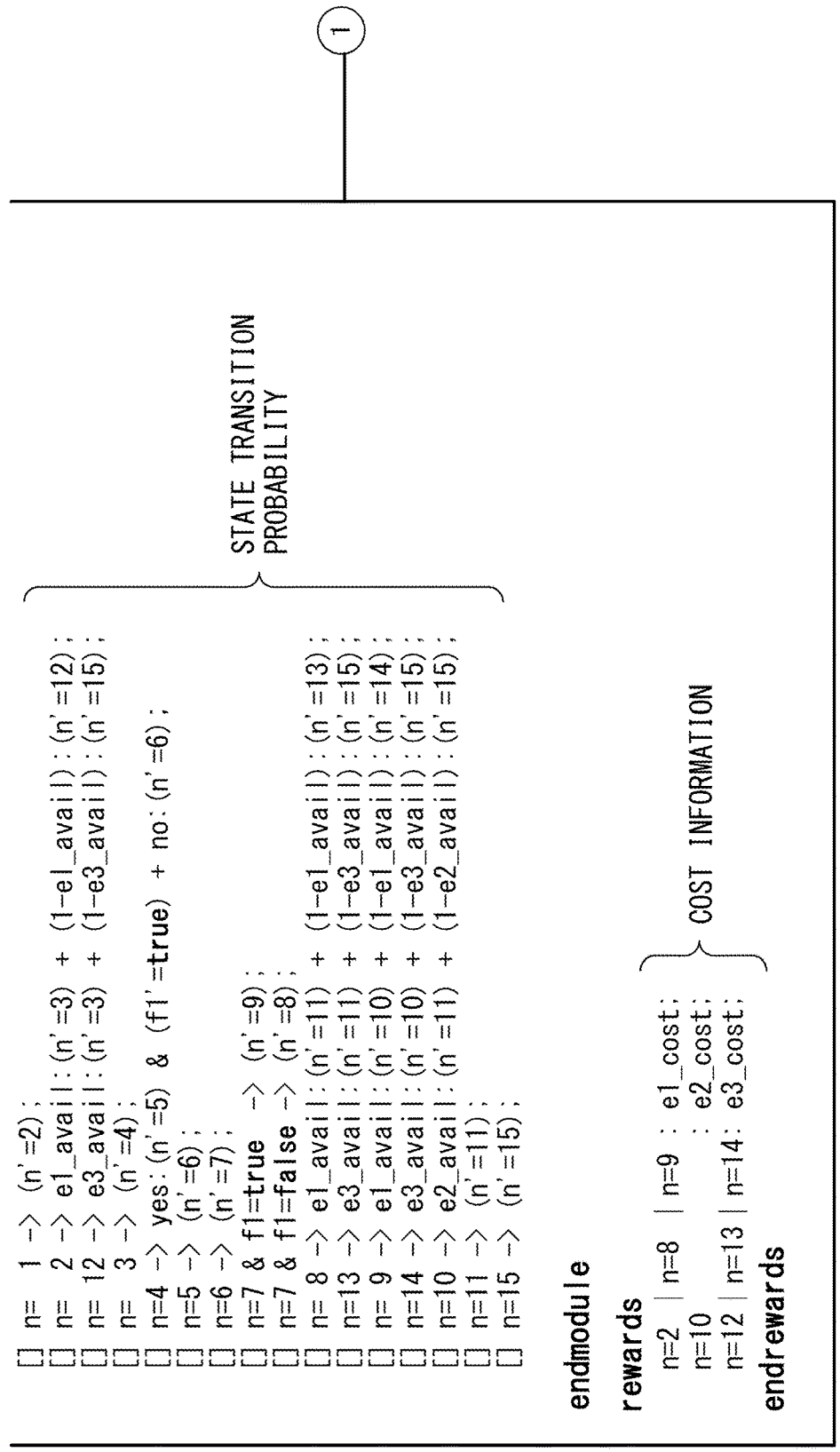

FIGS. 16A-16D illustrate examples of the calculation of the average cost and the average availability by using the probability model checking tool. FIGS. 16A and 16B illustrate the use probability model 82 that is changed to a model in an input form of the probability model checking tool. FIG. 16C illustrates an example of parameters given to the probability model checking tool as an input. FIG. 16C illustrates values of the average cost and the average availability that are calculated by using the probability model checking tool.

Figure 17:
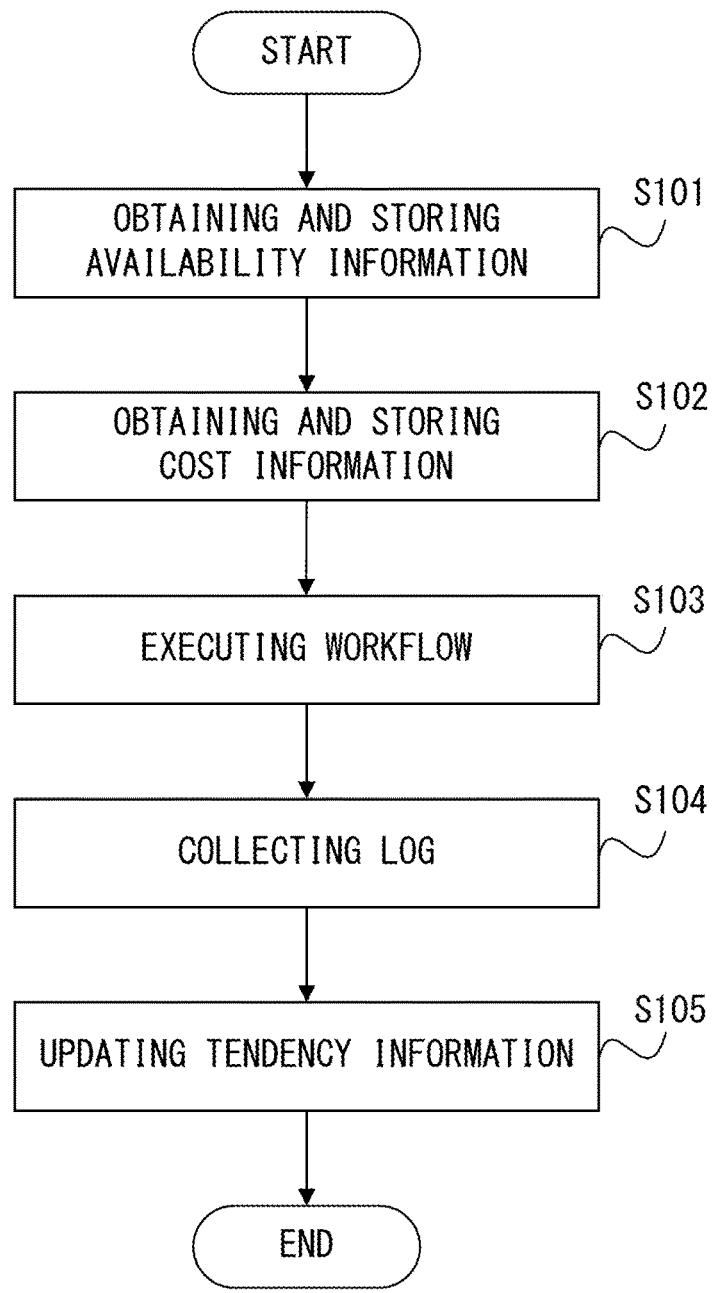
FIG. 17 is one example of a flowchart illustrating details of an information storage process executed by a collection unit in the embodiment.

An operational flow of an information storage process executed by the collection unit 32 in the embodiment is described next. FIG. 17 is one example of a flowchart illustrating details of the information storage process executed by the collection unit 32 in the embodiment.

In FIG. 17, the collection unit 32 obtains availability information, and stores the obtained availability information in the storage unit 33 (S101). The collection unit 32 may obtain the availability information, for example, from a cloud monitoring service. Next, the collection unit 32 obtains cost information, and stores the obtained cost information in the storage unit 33 (S102). The collection unit 32 may obtain the cost information, for example, from a cloud service provider.

S103 to S105 are related to a storage process of tendency information. An execution order of S101, S102 and S103 to S105 may be changed, and the timings at which the steps are executed may be independently specified timings.

The execution unit 31 executes the workflow 51 (S103). Next, the collection unit 32 collects an execution log of the workflow 51 executed in S103 (S104). Then, the collection unit 32 updates the tendency information 41 on the basis of the collected execution log (S105). Namely, the collection unit 32 initially extracts determination nodes that are included in the workflow 51 executed in S103 on the basis of the execution log collected in S104, and identifies determination input information input in the extracted determination nodes. Next, the collection unit 32 extracts a set of records that indicate the same classification as the extracted determination nodes from tendency information 41, and updates the "number of input times", the "total number" and the "ratio" of the extracted set of records in accordance with the identified determination input information. Then, the process is terminated.

Figure 18:
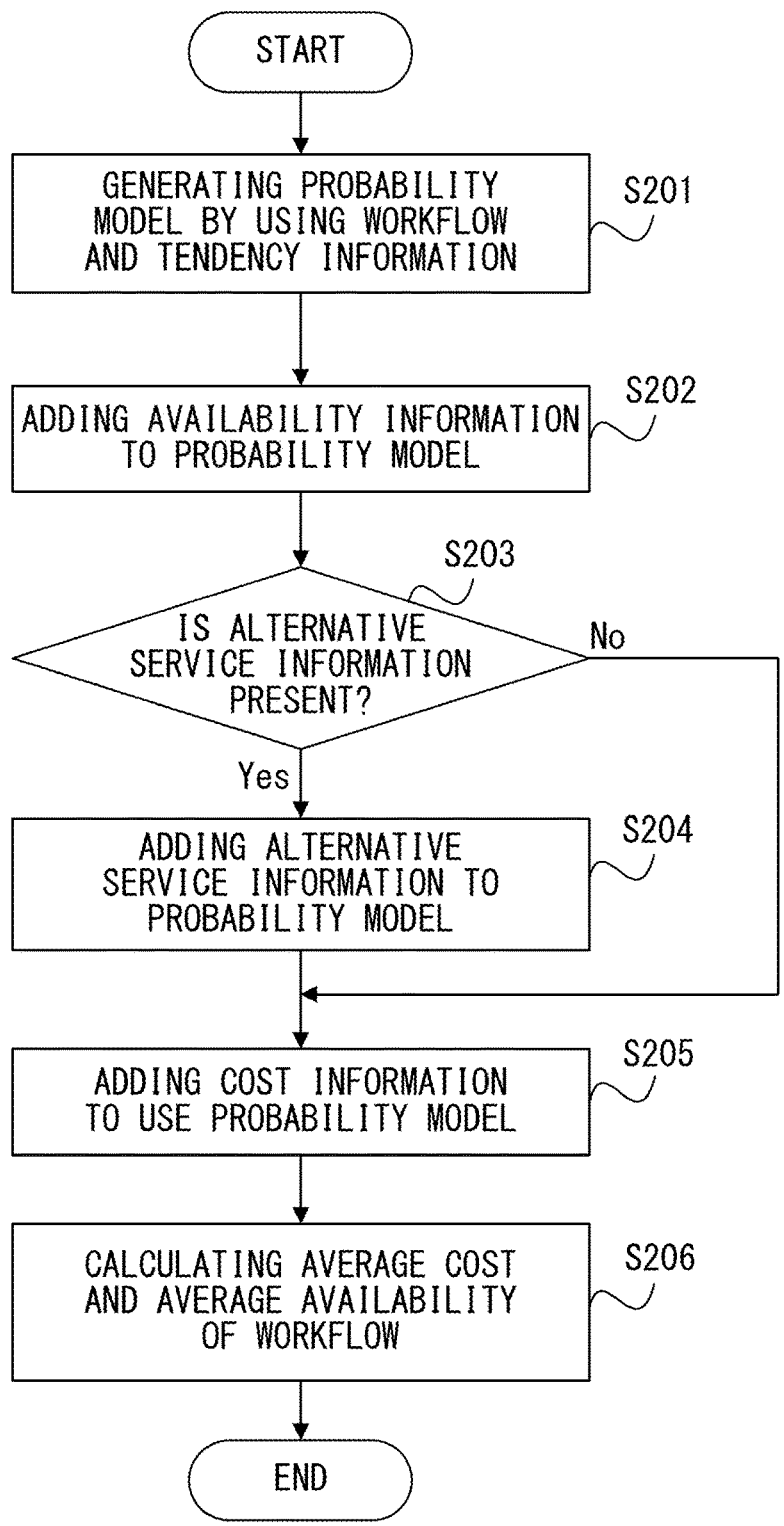
FIG. 18 is one example of a flowchart illustrating details of a process of a calculation of an average cost and average availability in the information processing apparatus according to the embodiment.

An operational flow of the calculation process of the average cost and the average availability of the information processing apparatus 30 according to the embodiment is described next. FIG. 18 is one example of a flowchart illustrating details of the calculation process of the average cost and the average availability of the information processing apparatus 30 according to the embodiment.

In FIG. 18, the probability model generation unit 71 initially generates the probability model 81 by using the workflow 51 and the tendency information 41 (S201). Namely, the probability model generation unit 71 obtains, from the tendency information 41, information indicating the input tendency of determination input information input in the past in a determination node that belongs to the same classification as each of the determination nodes, for each of the determination nodes in the workflow 51. Specifically, the information indicating the input tendency is information about the "ratio" of a record that belongs to the same classification as the determination node in FIG. 10. Then, the probability model generation unit 71 adds the obtained information indicating the input tendency as a probability that a branch condition is satisfied in each of the determination nodes in the workflow 51. Specifically, the probability model generation unit 71 associates, for example, the obtained information indicating the input tendency of each of the determination nodes with each of the determination nodes of the workflow 51 as the probability that the branch condition is satisfied.

Next, the use probability model generation unit 72 adds, to the probability model 81, information indicating the availability of each service called in the probability model 81 on the basis of the probability model 81 and the availability information 42 (S202). Specifically, the use probability model generation unit 72 updates the probability model 81, for example, by associating each service called in the probability model 81 with the obtained information indicating the availability of each service.

Then, the use probability model generation unit 72 determines whether an alternative service is present in the alternative service information 62 (S203). When the use probability model generation unit 72 determines that the alternative service is not present ("NO" in S203), it moves the process to S205. In contrast, when the use probability model generation unit 72 determines that the alternative service is present ("YES" in S203), it adds information of the alternative service to the probability model 81 of S202 (S204). Specifically, the use probability model generation unit 72 updates the probability model 81, for example, by associating a service called by each calling node of the probability model 81 of S202 with the obtained information indicating the alternative service of each service.

Next, the use probability model generation unit 72 generates a use probability model 82 by adding the cost information 43 to the probability model 81 of S204 (S205). Specifically, the use probability model generation unit 72 updates the probability model 81 by associating each service called in the probability model 81 of S204 with the obtained information indicating the cost of each service, and generates the use probability model 82.

Then, the calculation unit 73 calculates the average availability and the average cost of the workflow 51 by using the use probability model 82 (S206). Then, the process is terminated.

Figure 19:
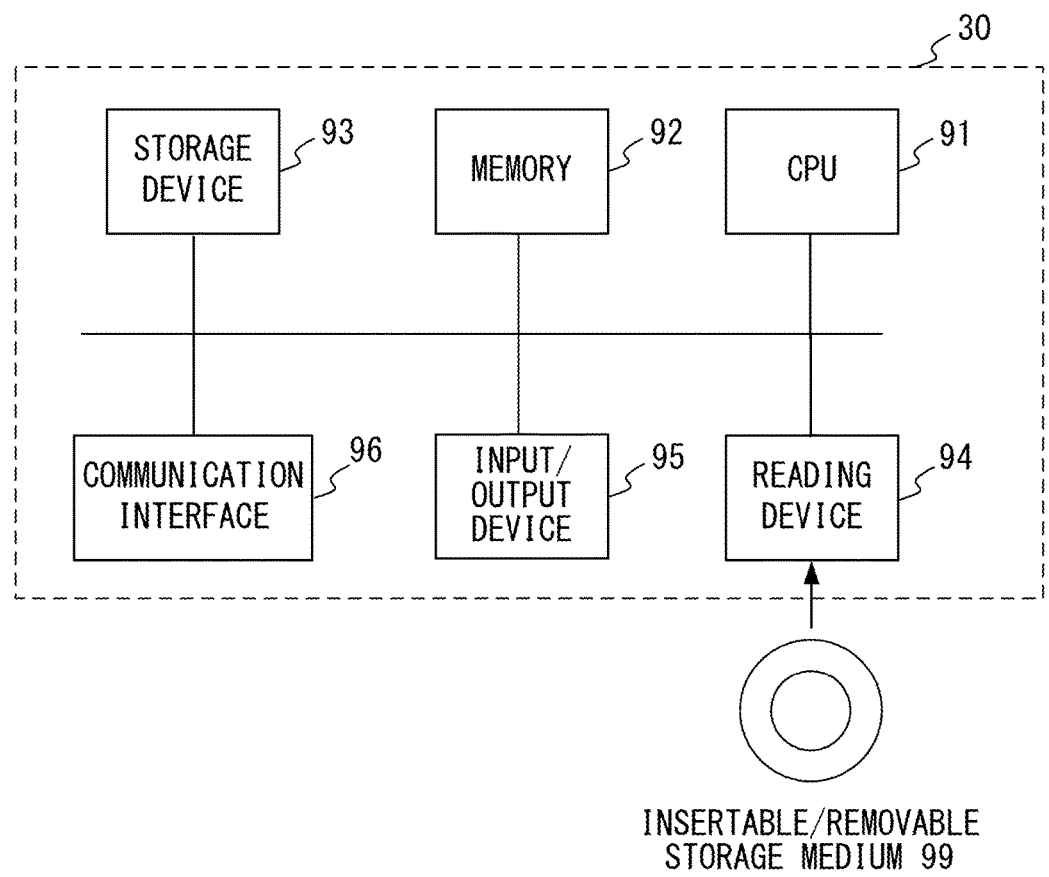
FIG. 19 illustrates one example of a hardware configuration of the information processing apparatus according to the embodiment.

One example of a hardware configuration of the information processing apparatus 30 according to the embodiment is described next. FIG. 19 illustrates one example of the hardware configuration of the information processing apparatus 30 according to the embodiment.

In FIG. 19, the information processing apparatus 30 includes a Central Processing Unit (CPU) 91, a memory 92, a storage device 93, a reading device 94, an input/output device 95 and a communication interface 96. The CPU 91, the memory 92, the storage device 93, the reading device 94, the input/output device 95 and the communication interface 96 are interconnected via a bus.

The CPU 91 provides some or all of the functions of the execution unit 31, the collection unit 32 and the estimation unit 34 by executing a program that describes the steps of the above described flowcharts with the use of the memory 92. Note that the functions of the execution unit 31 may be provided by a CPU of one or more different information processing apparatuses connected to the information processing apparatus 30 via a communication network or the like.

The memory 92 is, for example, a semiconductor memory, and is configured by including a Random Access Memory (RAM) area and a Read Only Memory (ROM) area. The memory 92 provides some or all of the functions of the storage unit 33. The storage device 93 is, for example, a hard disk. Note that the storage device 93 may be a semiconductor memory such as a flash memory or the like. Alternatively, the storage device 93 may be an external storage device. The storage device 93 may provide the functions of the storage unit 33.

The reading device 94 accesses an insertable/removable storage medium 99 in accordance with an instruction of the CPU 91. The insertable/removable storage medium 99 is implemented, for example, with a semiconductor device (a USB memory or the like), a medium (a magnetic disk or the like) to and from which information is input and output with a magnetic action, a medium (a CD-ROM, a DVD, or the like) to and from which information is input and output with an optical action, or other media. Note that the reading device 94 may not be included in the information processing apparatus 30.

The input/output device 95 accepts an input of the workflow 51, and outputs the average availability and the average cost information 53 that are calculated by the CPU 91.

The communication interface 96 communicates with a different information processing apparatus via a network in accordance with an instruction of the CPU 91.

The program according to the embodiment is provided to the information processing apparatus 30, for example, in the following forms.
(1) Preinstalled in the storage device 93.
(2) Provided by the insertable/removable storage medium 99.

(3) Provided from a program server (not illustrate) via the communication interface 96.

Additionally, part of the information processing apparatus 30 according to the embodiment may be implemented with hardware. Alternatively, the information processing apparatus 30 may be implemented by combining software and hardware.

The embodiment assumes that the cost information 43 indicates a usage cost per service. However, the cost information 43 may indicate a calculation formula or the like of a cost that varies in accordance with the usage time of a service or the amount of used data. In this case, to a calling node of the workflow 51 to be estimated, identification information of a service used in the calling node, and information such as the usage time of the service, the amount of used data, or the like may be added. The average cost of the service according to the usage time of the service or the amount of used data may be calculated by using these items of information.

This embodiment is not limited to the above described one. The embodiment can take various configurations or embodiments within a scope that does not depart from the gist of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method, comprising:
   receiving, by using a computer, workflows each including a conditional branch and procedures;
   sequentially executing, by using the computer, processes of the individual workflows;
   keeping, by using the computer, execution logs for the individual workflows;
   calculating, by using the computer, branch probability information indicating a probability that a condition has been satisfied in an executed conditional branch recorded in the execution logs, the branch probability information being calculated for each piece of classification information defined for the conditional branch included in the workflows;
   obtaining, by using the computer, cost information and availability information, the cost information indicating a cost needed for a service provided by the procedure included in the workflows, the availability information indicating availability of the service;
   storing, by using the computer, the branch probability information, the cost information and availability information in a memory;
   receiving, by using the computer, a certain workflow to be estimated, the certain workflow including a conditional branch and procedures;
   obtaining, by using the computer, the branch probability information corresponding to a classification of the conditional branch included in the certain workflow from the memory;
   obtaining, by using the computer, the cost information and the availability information that correspond to the procedure included in the certain workflow from the memory;
   calculating an execution probability of the procedure included in the certain workflow based on the obtained branch probability information, by using the computer;
   calculating, as an estimation value for an availability, a probability that the certain workflow properly or improperly terminates, and, as an estimation value for a cost, a cost needed to execute the certain workflow by using the calculated execution probability of the procedure, the obtained cost information and the obtained availability information, by using the computer; and
   outputting, as a report of a result of an estimation of the certain workflow, the estimation value of the availability and the estimation value of the cost, by using the computer, wherein
   in the calculation of a probability that the certain workflow properly or improperly terminates and of a cost needed to execute the certain workflow, the computer executes a process comprising:
      calculating, for each process path that ranges between a start and proper termination of the certain workflow, a transition probability that each procedure transitions according to that process path, the calculation being performed through a multiplication of the calculated execution probability and a value of the obtained availability information for that procedure;
      calculating, as a probability that the certain workflow properly terminates, a total sum of the transition probabilities calculated for the process paths;
      calculating, for each of the process paths, a cost needed to execute each procedure according to that process path, the calculation being performed through a multiplication of the calculated execution probability and a value of the obtained cost information for that procedure; and
      calculating, as a cost needed to execute the certain workflow, a total sum of the costs calculated for the process paths.

2. The information processing method according to claim 1, further comprising:
   obtaining alternative information that describes an alternative procedure of the procedure included in the certain workflow, by using the computer;
   calculating an execution probability of the alternative procedure by using the branch probability information, the availability information and the alternative information; and
   calculating a probability that the certain workflow properly or improperly terminates, and a cost needed to execute the received workflow by using the execution probability of the procedure, the execution probability of the alternative procedures, the cost information and the availability information, by using the computer.

3. The information processing method according to claim 1, wherein
   the classification information is classification information that corresponds to identification information of a user who inputs information used to determine whether a condition of a conditional branch is satisfied.

4. A non-transitory computer-readable recording medium having stored therein a program for causing a computer to execute an information processing process comprising:

receiving workflows each including a conditional branch and procedures;

sequentially executing processes of the individual workflows;

keeping execution logs for the individual workflows;

calculating branch probability information indicating a probability that a condition has been satisfied in an executed conditional branch recorded in the execution logs, the branch probability information being calculated for each piece of classification information defined for the conditional branch included in the workflows;

obtaining cost information and availability information, the cost information indicating a cost needed for a service provided by the procedure included in the workflows, the availability information indicating availability of the service;

storing the branch probability information, the cost information and availability information in a memory;

receiving a certain workflow to be estimated, the certain workflow including a conditional branch and procedures;

obtaining the branch probability information corresponding to a classification of the conditional branch included in the certain workflow from the memory;

obtaining the cost information and the availability information that correspond to the procedure included in the certain workflow from the memory;

calculating an execution probability of the procedure included in the certain workflow based on the obtained branch probability information;

calculating, as an estimation value for an availability, a probability that the certain workflow properly or improperly terminates, and, as an estimation value for a cost, a cost needed to execute the certain workflow by using the calculated execution probability of the procedure, the obtained cost information and the obtained availability information; and outputting, as a report of a result of an estimation of the certain workflow, the estimation value of the availability and the estimation value of the cost, wherein in the calculation of a probability that the certain workflow properly or improperly terminates and of a cost needed to execute the certain workflow, the computer executes a process comprising:

calculating, for each process path that ranges between a start and proper termination of the certain workflow, a transition probability that each procedure transitions according to that process path, the calculation being performed through a multiplication of the calculated execution probability and a value of the obtained availability information for that procedure;

calculating, as a probability that the certain workflow properly terminates, a total sum of the transition probabilities calculated for the process paths;

calculating, for each of the process paths, a cost needed to execute each procedure according to that process path, the calculation being performed through a multiplication of the calculated execution probability and a value of the obtained cost information for that procedure; and calculating, as a cost needed to execute the certain workflow, a total sum of the costs calculated for the process paths.

\* \* \* \* \*